Figure 1:
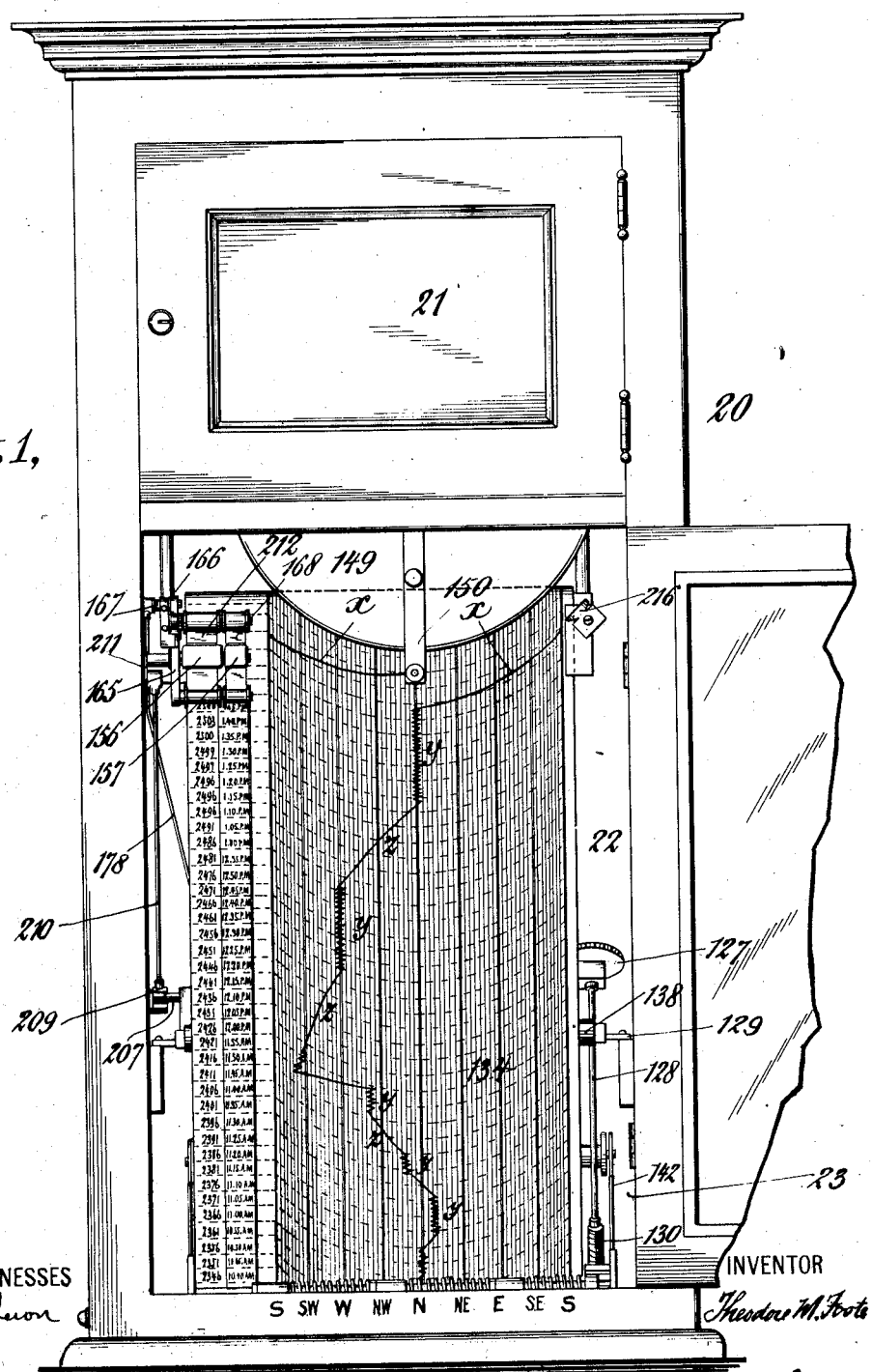

No. 886,788.

PATENTED MAY 5, 1908.

T. M. FOOTE.
COURSE AND LOG RECORDER.
APPLICATION FILED AUG. 11, 1906.

10 SHEETS—SHEET 2.

Fig. 2,

WITNESSES:

INVENTOR

No. 886,788. PATENTED MAY 5, 1908.
T. M. FOOTE.
COURSE AND LOG RECORDER.
APPLICATION FILED AUG. 11, 1906.

10 SHEETS—SHEET 3.

WITNESSES:

INVENTOR
Theodore M. Foote
BY
ATTORNEYS

No. 886,788. PATENTED MAY 5, 1908.
T. M. FOOTE.
COURSE AND LOG RECORDER.
APPLICATION FILED AUG. 11, 1906.
10 SHEETS—SHEET 5.
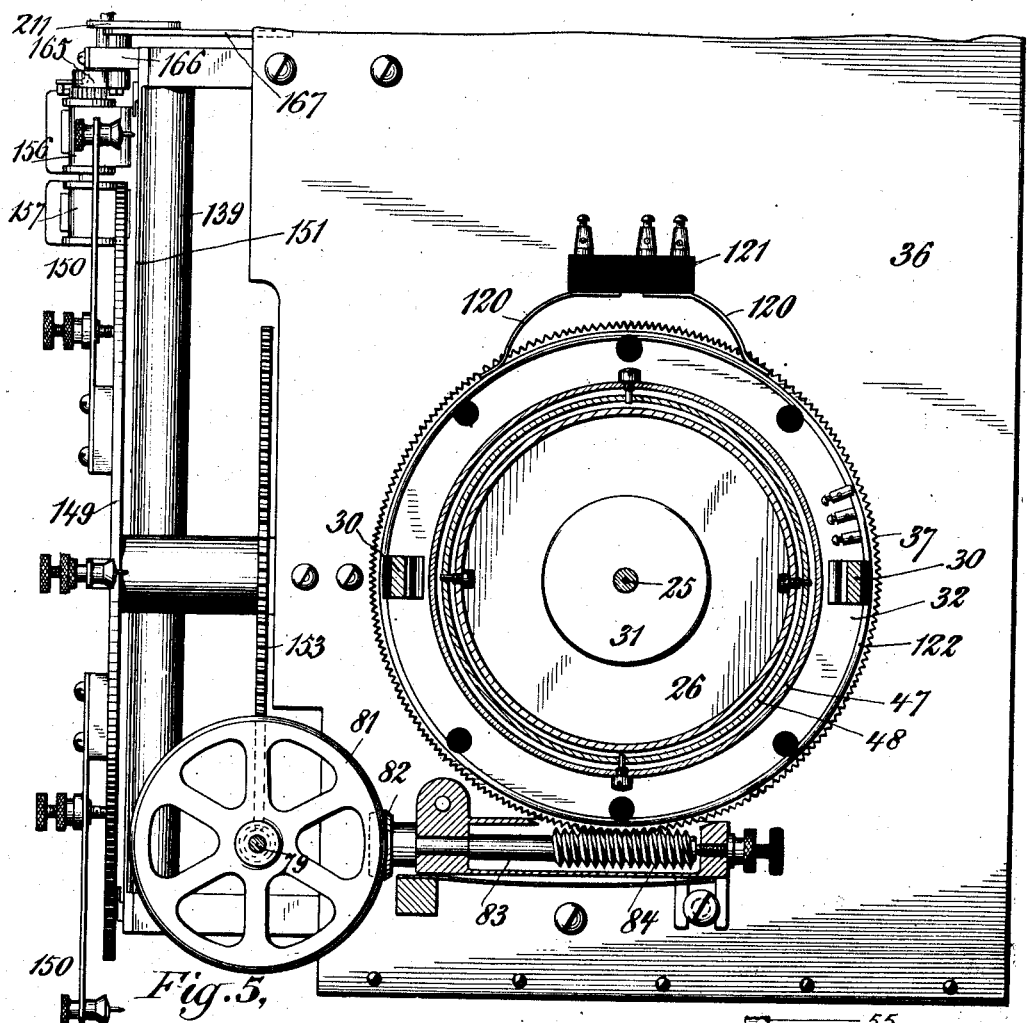
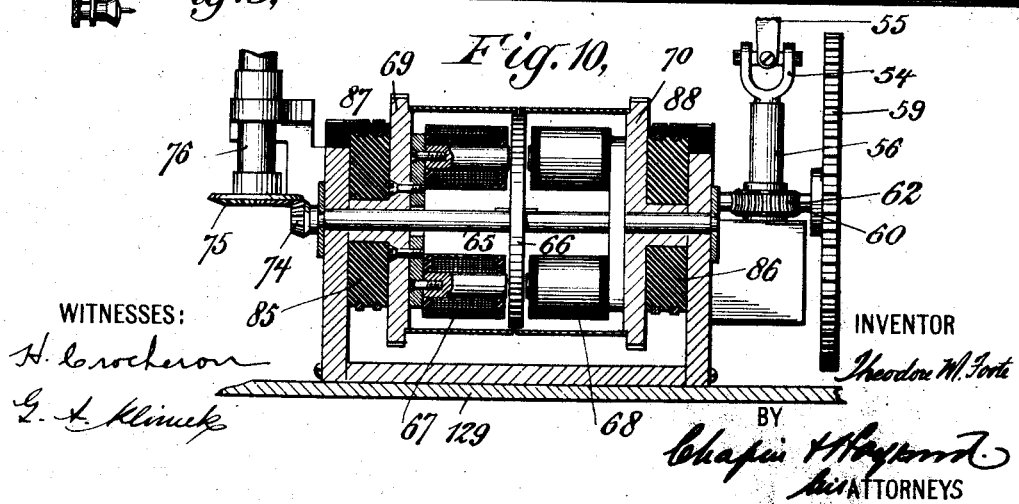
WITNESSES:
INVENTOR
BY
ATTORNEYS No. 886,788. PATENTED MAY 5, 1908.
T. M. FOOTE.
COURSE AND LOG RECORDER.
APPLICATION FILED AUG. 11, 1906.
10 SHEETS—SHEET 6.

WITNESSES:

INVENTOR

BY
ATTORNEYS

No. 886,788.

T. M. FOOTE.
COURSE AND LOG RECORDER.
APPLICATION FILED AUG. 11, 1906.

PATENTED MAY 5, 1908.

10 SHEETS—SHEET 7.

WITNESSES:

INVENTOR
Theodore M. Foote
BY
Chapin & Hayward
His ATTORNEYS

No. 886,788. PATENTED MAY 5, 1908.
T. M. FOOTE.
COURSE AND LOG RECORDER.
APPLICATION FILED AUG. 11, 1906.
10 SHEETS—SHEET 8.
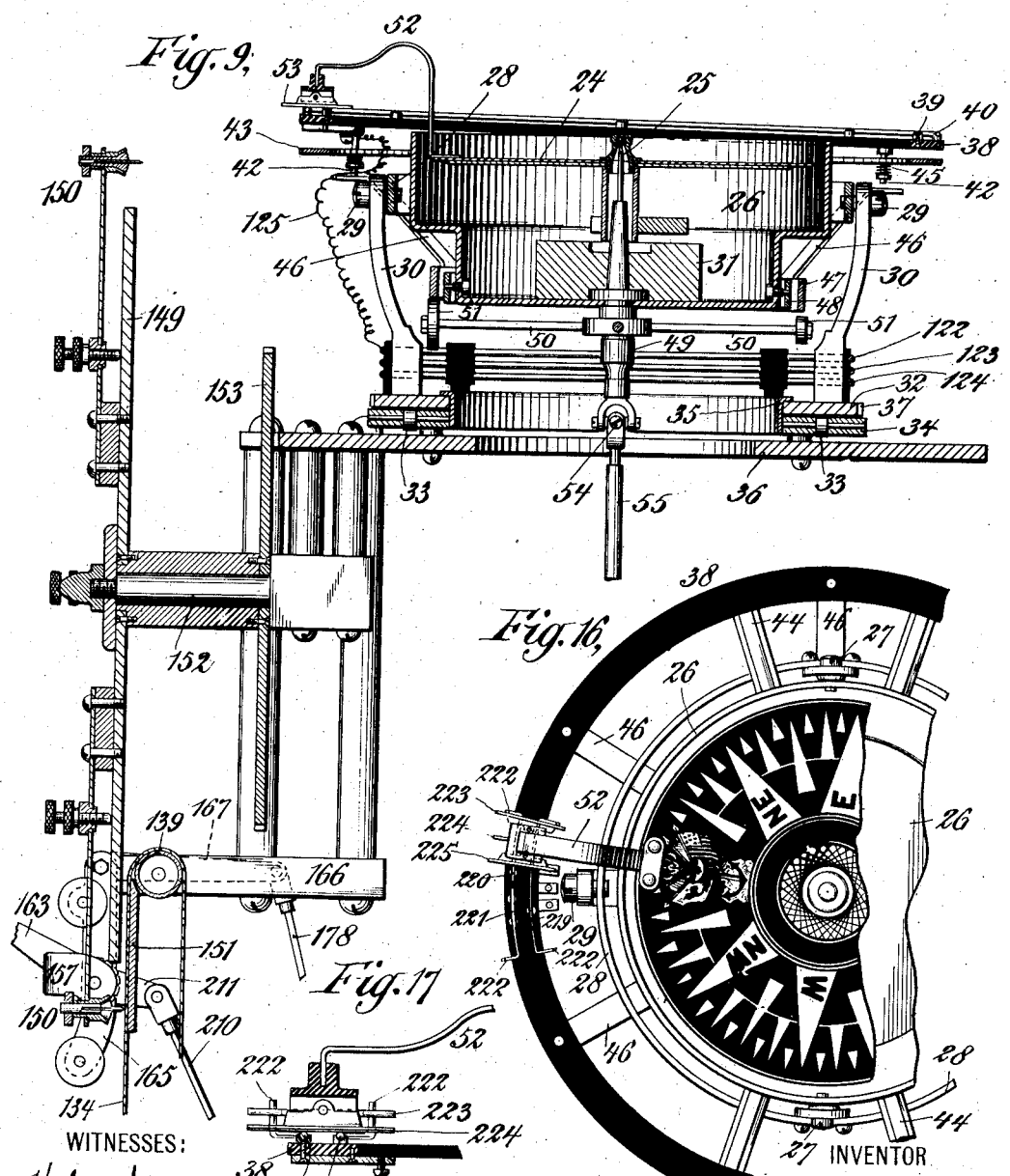
WITNESSES:
INVENTOR
Theodore M. Foote
BY
ATTORNEYS

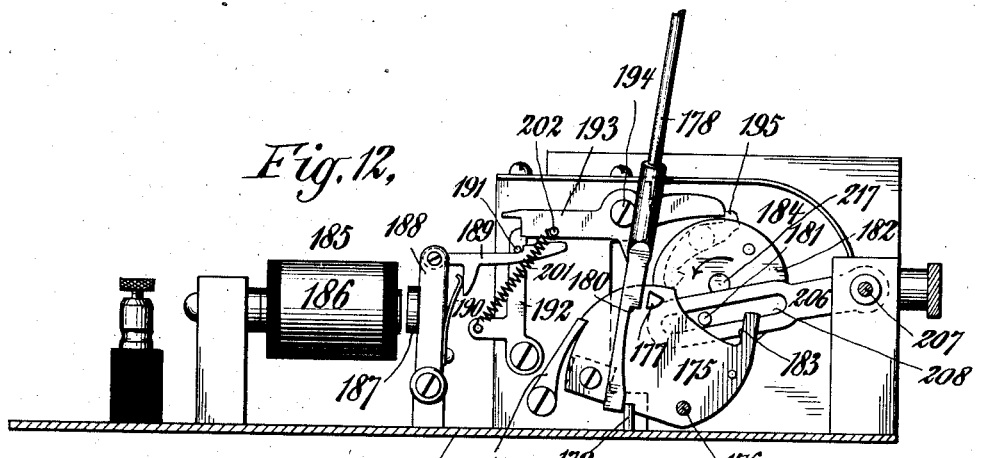
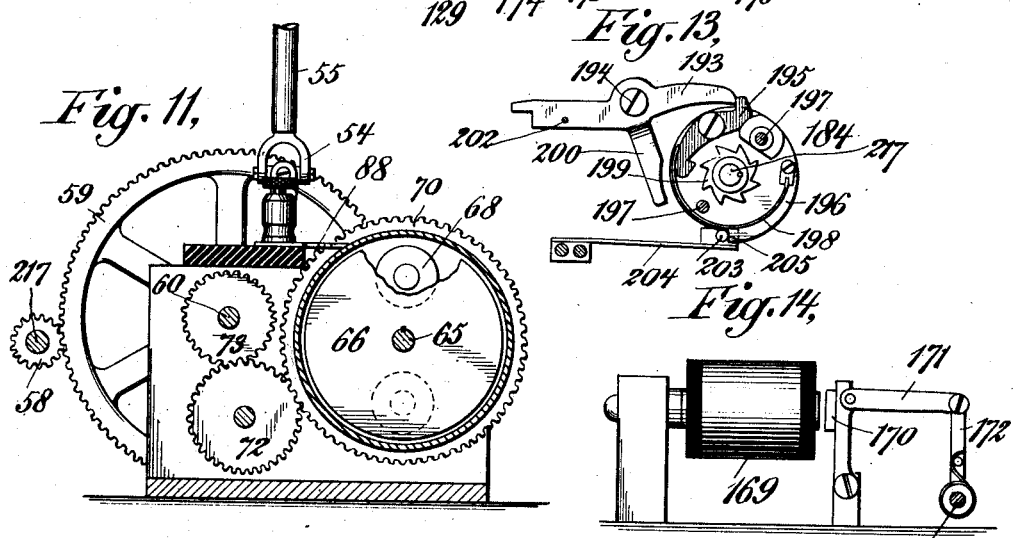
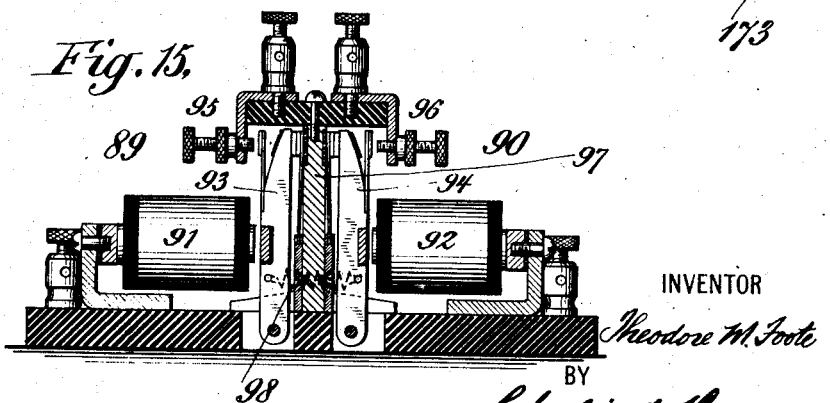

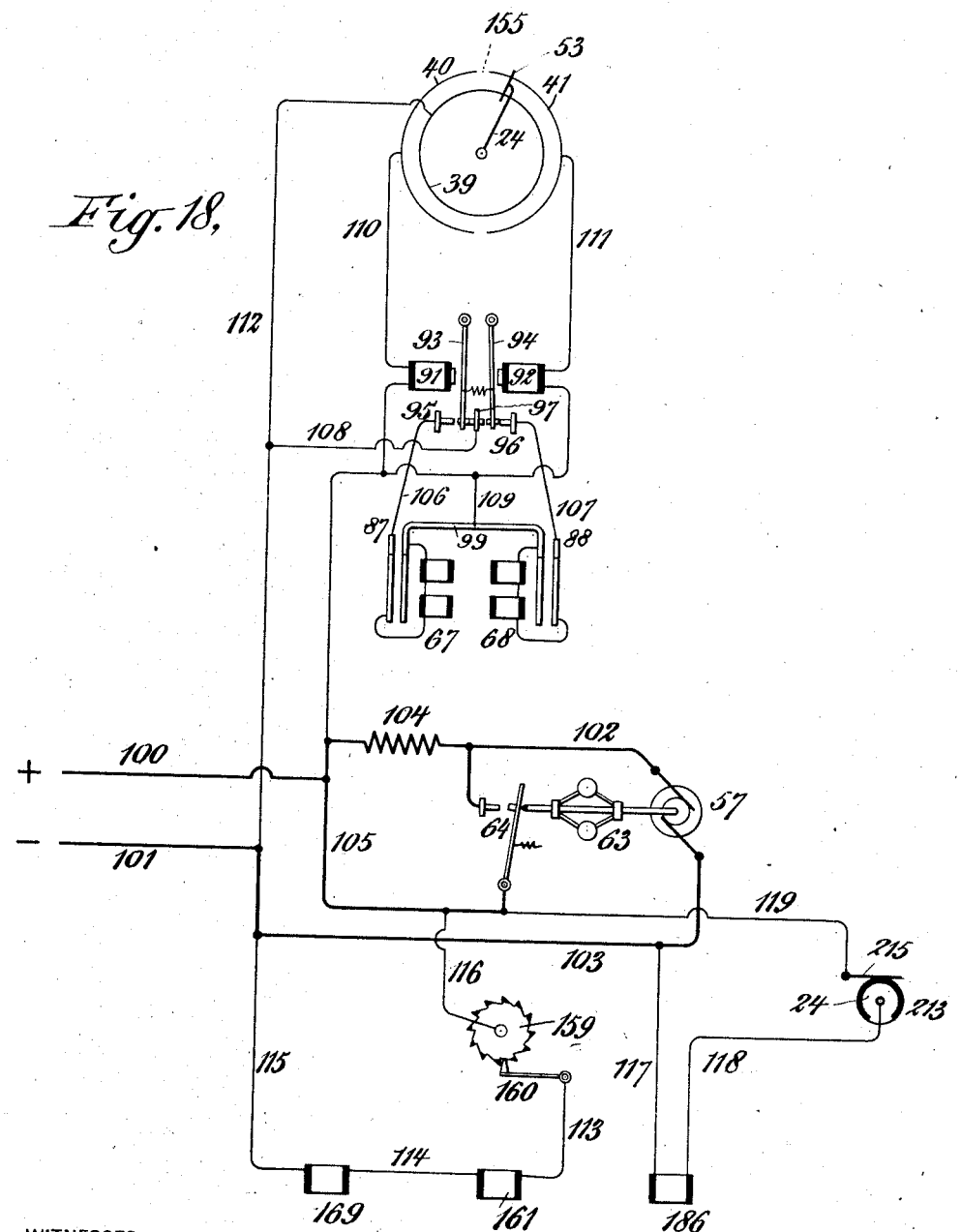

UNITED STATES PATENT OFFICE.

THEODORE M. FOOTE, OF ALLSTON, MASSACHUSETTS.

COURSE AND LOG RECORDER.

No. 886,788.  Specification of Letters Patent.  Patented May 5, 1908.

Application filed August 11, 1906. Serial No. 330,110.

*To all whom it may concern:*

Be it known that I, THEODORE M. FOOTE, a citizen of the United States of America, and a resident of Allston, county of Suffolk, State of Massachusetts, have invented a certain new and useful Course and Log Recorder, of which the following is a specification, reference being had to the accompanying drawings, forming a part thereof.

My invention relates to a course and log recorder, and comprises means adapted to be carried by a vessel, for recording particulars in connection therewith as to direction, distance, speed and time.

The objects of my invention are first to accurately plot the course of a vessel for any desired period, second, to record the direction in which the vessel is heading when the same is at anchor or tied up to a wharf, third, to record intervals of time, which record may be read with the direction record whereby the direction in which the vessel was heading at any particular time may be quickly ascertained, fourth, to record units of distance, which record may be read with the time and direction records whereby the distance traveled and hence location of the vessel at any time and the direction in which the same was heading when in the location indicated by the chart, may be readily computed.

For the purpose of recording the ship's course, and the direction thereof at all times, I employ means controlled by the compass needle for recording the direction indicated by the compass needle itself, and in this connection I have provided a novel circuit making and breaking device controlled by a compass in such a manner as to interfere with the movement thereof to the least possible extent, for it will be realized that mechanism which would appreciably oppose free movement of the compass would be useless, as it would interfere with the accuracy thereof. This portion of my invention comprises a member adapted to be moved toward and away from the horizontal plane in which the compass needle, or a part carried thereby, moves, so as to contact lightly with the needle or the said part for a short period after suitable intervals, the compass needle being entirely free to move during said intervals. The contact of this member with the needle or the said part controls an electric circuit or electric circuits, which control I may employ for various purposes as may be desired. By reason of the fact that the member moves into contact with the compass needle at substantially right angles to its plane of movements, it will have no tendency to thereby give the needle an impulse to move in either one direction or the other, and, although this contact will momentarily hold the needle against free movement, the needle will be free to move during the intervals of time between such contact, and hence any slight inaccuracy of the needle during such periods of contact will be immediately corrected when contact ceases.

In the form of apparatus illustrated herein, I have employed two main electric circuits controlled by the compass needle, the closing of one or other of these circuits tending to move a recording device in one direction or the other. The aforesaid circuit controlled member is mounted to rotate concentrically with the compass needle, and is connected to move synchronously with the recording device, and the direction in which the said circuit controlled member is arranged to move, upon the closing of one or other of the said circuits, is in a direction following the direction of movement of the compass needle. Thus the said member tends to constantly move to, and maintain itself in, a neutral position with respect to the said needle, and the recording device moving synchronously therewith, as stated, will constantly record the position of the needle.

The record is conveniently made upon a constantly moving strip of paper, to which continuous feeding movements are given, regardless as to whether the vessel is moving forward at the time or not. A continuous line will thus be traced by the recording device, which will indicate the successive directions of the compass needle, and hence the successive directions in which the ship heads.

For the purpose of recording intervals of time and distance I provide time mechanism and counting mechanism, together with printing means for printing the intervals of time and distance registered thereby. The printing mechanism is arranged to operate at predetermined intervals of time, and a succession of time and distance records will thus be printed successively upon the record sheet, and these records will be caused to appear at points thereon corresponding with the points at which the course chart is being recorded at the moment. The relation of the time and distance intervals will give the speed, so that the chart will give a complete record of time, speed, distance and direction as is required.

In carrying out my invention I have employed many new principles, and have devised many novel mechanical and electrical combinations, and in order that my invention may be fully understood, I will now describe in detail a complete apparatus constituting an embodiment thereof and which is illustrated in the accompanying drawings, and will then point out the novel features in claims.

Figure 2:
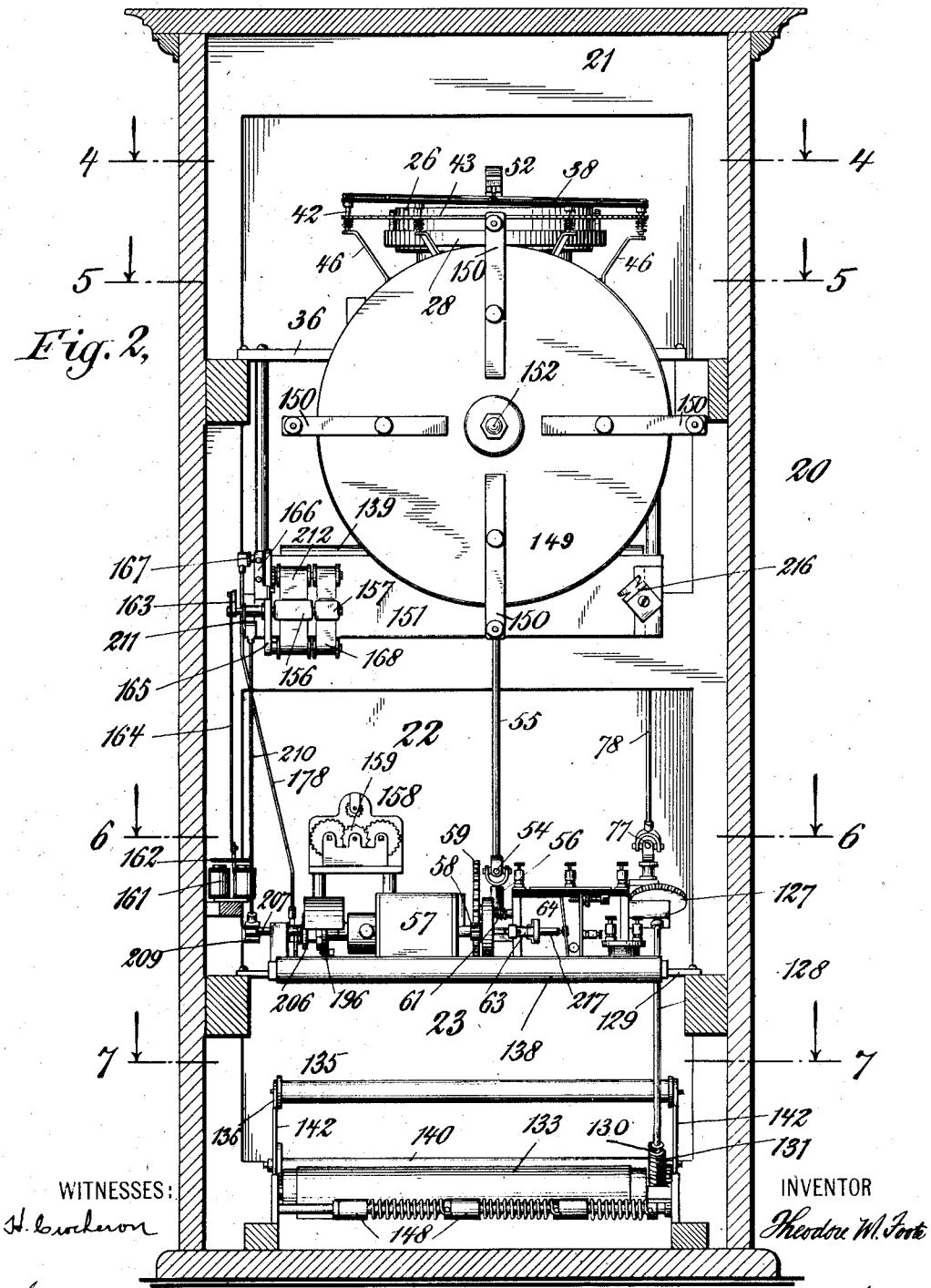
Figure 3:
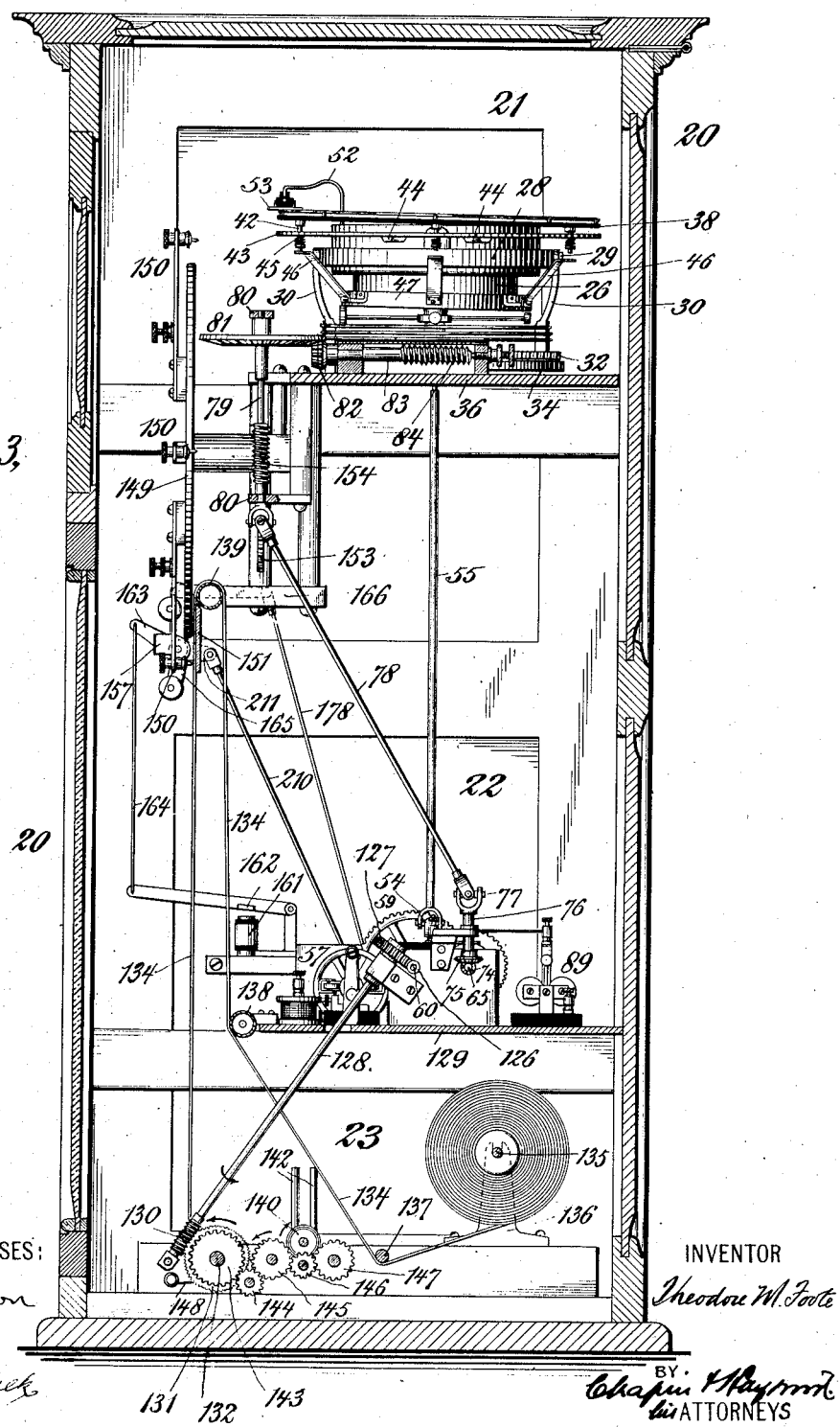
Figure 4:
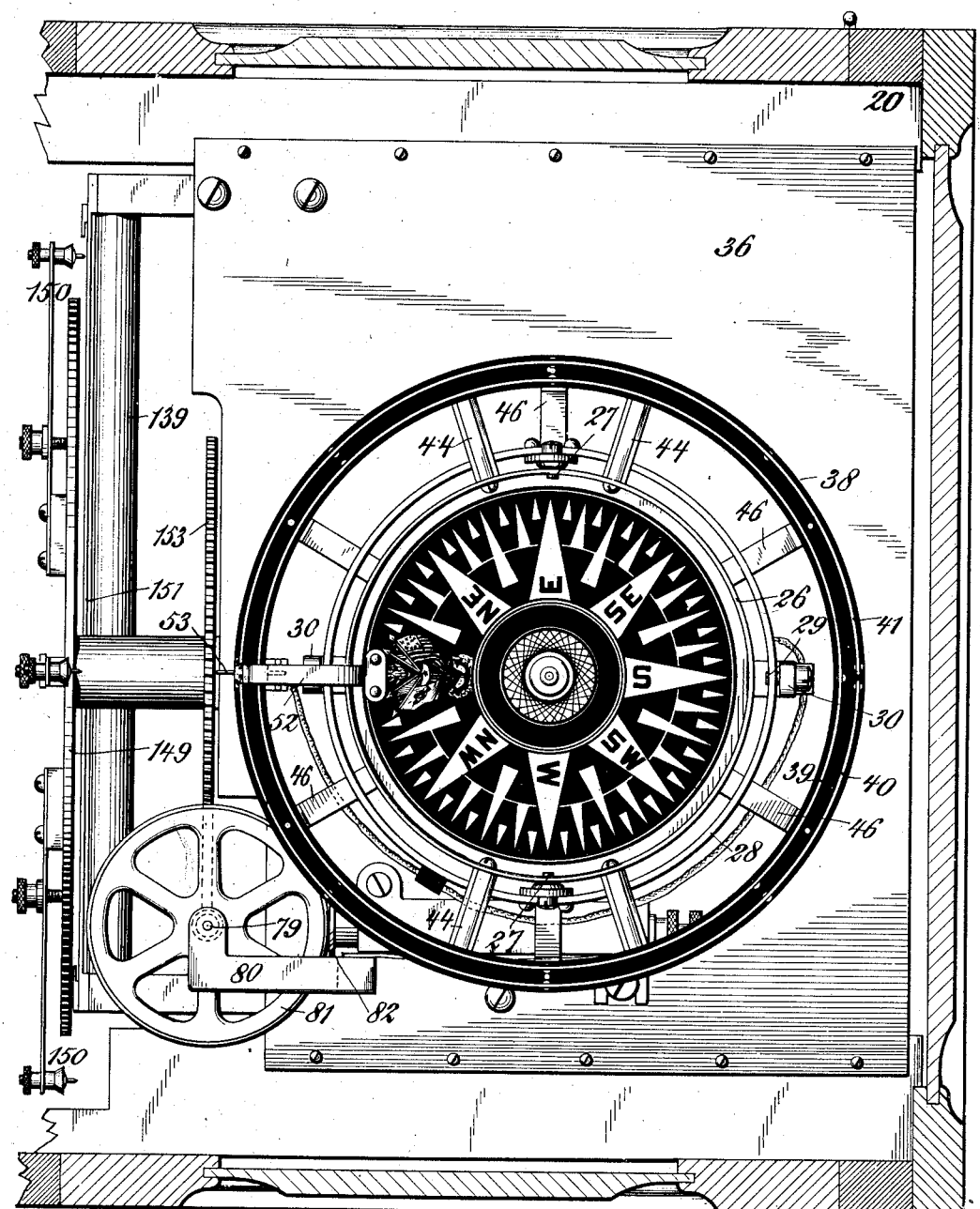
Figure 6:
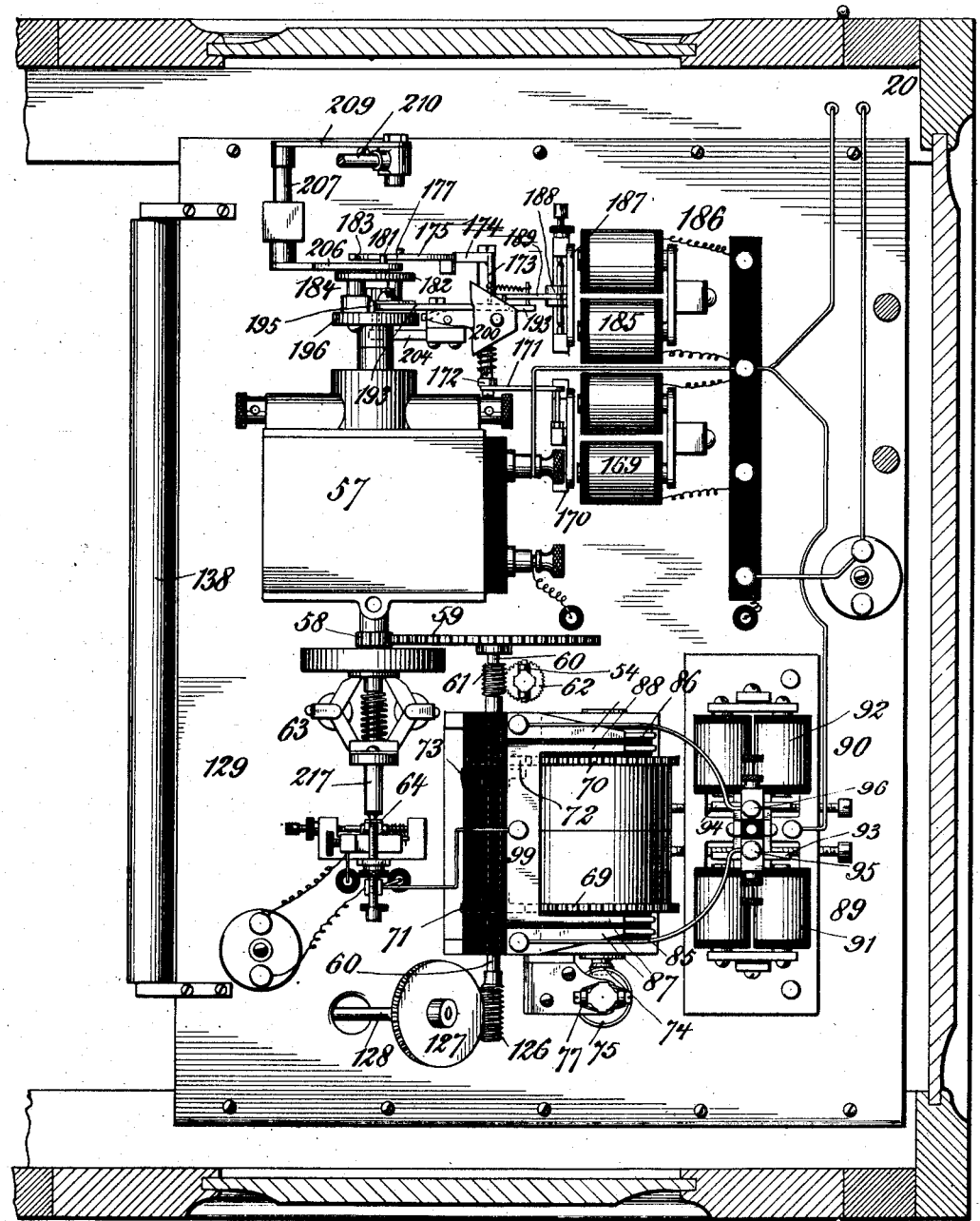
Figure 7:
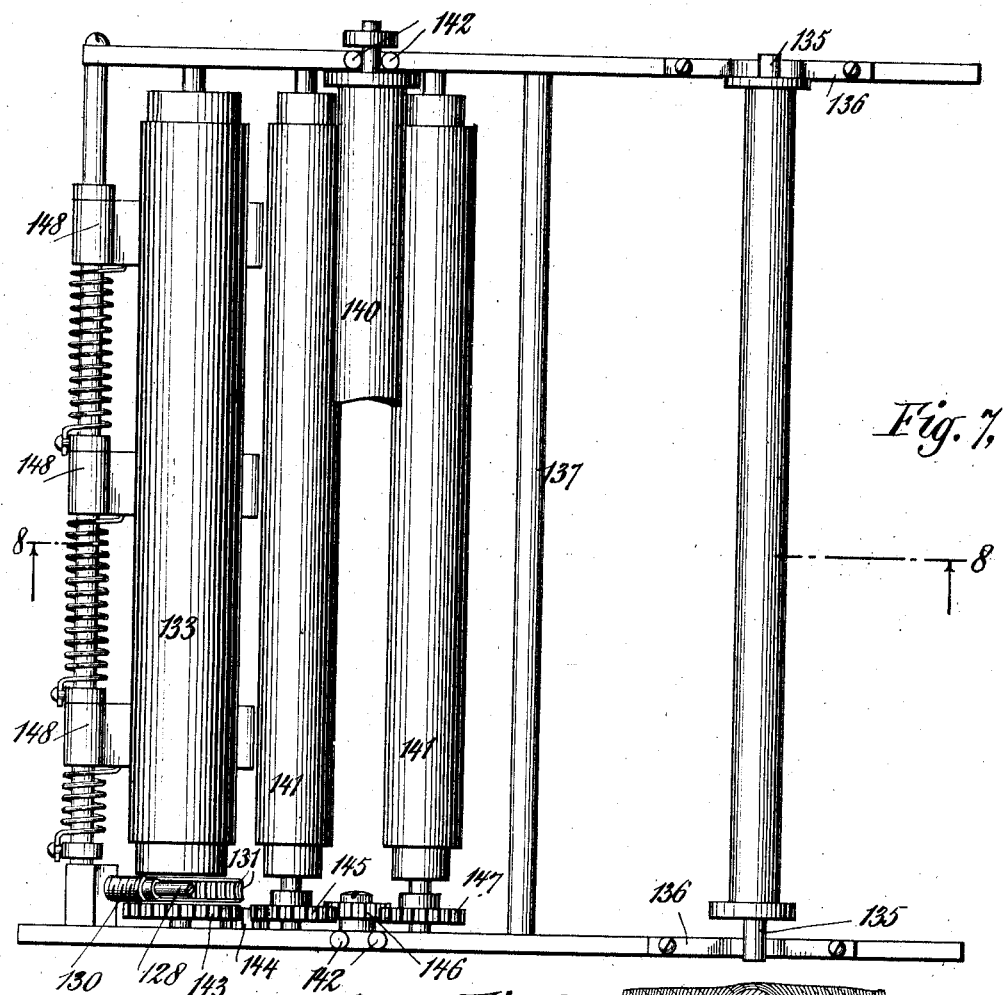
Figure 8:
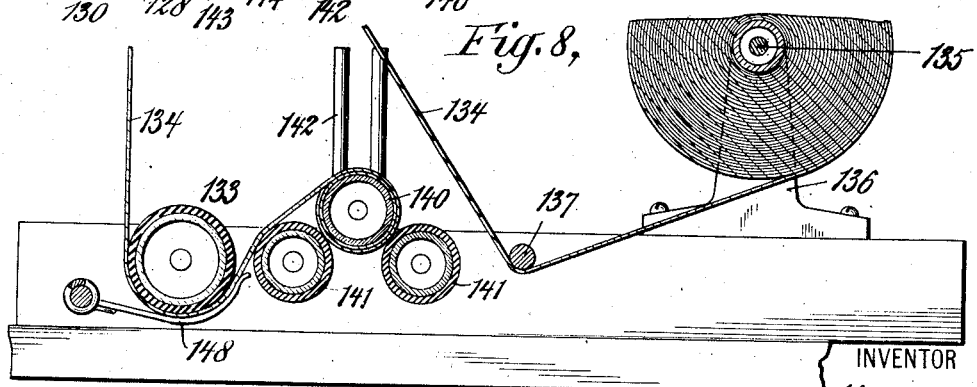

In the drawings: Figure 1 is a front view of the complete instrument and its case, with one of the doors thereof open disclosing certain of the mechanism at the interior thereof and a portion of a record strip upon which a record is being made. Fig. 2 is a front view of the interior mechanism of the instrument with the case in vertical transverse section. Fig. 3 is a view in side elevation of the interior mechanism with the casing in vertical longitudinal section, the plane of section thereof being at right angles to the plane of section of Fig. 2. Fig. 4 is a top view of the interior mechanism with the casing in horizontal section, the plane of section being taken substantially upon the line 4, 4 of Fig. 2. Fig. 5 is a view of the interior mechanism removed from the casing, the said view being in horizontal section substantially upon the plane of the line 5, 5 of Fig. 2. Fig. 6 is a view in horizontal section through the entire machine substantially upon the plane of the line 6, 6 of Fig. 2, the front part of the casing being broken away. Fig. 7 is a view in horizontal section substantially upon the plane of the line 7, 7 of Fig. 2, of mechanism with the casing removed. Fig. 8 is a detail view in vertical section through the part shown in Fig. 7, the plane of section being substantially upon the line 8, 8 of Fig. 7. Fig. 9 is a view in vertical longitudinal section through the upper part of the machine, with the casing removed. Fig. 10 is a detail sectional view of magnetic clutch mechanism employed. Fig. 11 is a view in central vertical transverse section through the parts shown in Fig. 10. Fig. 12 is a view in side elevation of certain controlling means employed for the time and distance recording devices. Fig. 13 is a detail view of a one-revolution clutch employed in connection therewith. Fig. 14 is a view in side elevation of the relay for controlling the printing or recording of the time and distance, and is to be read in connection with the parts shown in Fig. 12. Fig. 15 is a view in central vertical section of the relays employed in connection with the main circuit closing means. Fig. 16 is a partial top view of a circuit making and breaking device controlled by the compass, but of a form slightly different to that shown in the other figures. Fig. 17 is a detail sectional elevation of the contact points and parts supporting them comprised in the modification illustrated in Fig. 16. Fig. 18 is a diagrammatic view illustrating conventionally the electric circuits of the machine.

The machine as a whole comprises a casing 20 having suitable openings and doors whereby access may be readily had to the interior thereof, the interior part being divided substantially into three compartments, an upper compartment 21, an intermediate compartment 22, and a lower compartment 23. The upper compartment 21 contains the compass and the circuit making and breaking means partially comprised in, and controlled thereby. The intermediate compartment 22 contains the motor for driving the entire mechanism, and various electrical mechanism such as selecting relays and magnetic clutches, together with means for controlling the time and distance recording devices. The lower compartment 23 contains principally the means for driving the record sheet.

The compass device comprises a compass needle 24 mounted, as usual, upon a central bearing point 25, whereby it is free to rotate in a horizontal plane, and hence under the influence of magnetic attraction to constantly point toward the north. The central bearing point 25 is mounted in a cylindrical casing 26, the said casing being pivoted by means of horizontal pivots 27 to a gimbal ring 28, which is, in turn, pivoted by means of horizontal pivots 29 to supports 30, the said pivots 29 and 27 being disposed 90 degrees from each other, in the usual manner in gimbal connections, so that the casing 26 is free to swing in every direction, whereby the compass needle may be maintained in a true horizontal position regardless of the motion of the ship, all as in a manner well known and understood in connection with ships' compasses. A weight 31 is disposed within the casing 26 at some distance below the pivotal points of support therefor, so as to bring the center of gravity thereof well below the said points of support.

Instead of securing the supports 30 upon a stationary part of the device, as is usual in ships' compasses, in the present instance the said supports are secured upon a platform 32, which is arranged to rotate about a center concentric with the bearing point 25. This platform rests upon anti-friction wheels 33 journaled in a stationary support 34, and is guided centrally by means of a flange 35 secured fast to the part 34. The part 34 is secured fast to a shelf 36, which is a portion of the main casing 20, above referred to, and which separates the compartments 21 and 22 from each other.

The platform 32, at its edge, is provided with peripheral teeth 37, by which the same may be rotated. Rotation of the platform 32 will, of course, result in the rotation of the compass supporting casing 26, as will be well understood.

The compass supporting casing carries an insulating ring 38, upon which is supported three contact strips 39, 40 and 41. These contact strips are in the form of two concentric rings, the inner ring being continuous and designated by the reference character 39, and the outer ring being formed in two segments designated respectively by the reference characters 40 and 41. The said insulating ring 38 has depending posts 42, which are fitted in orifices in a metallic ring 43 secured fast to the cylindrical casing 26 by means of arms 44. The engagement of the posts 42 with the orifices in the metallic ring 43 serves as a guide to prevent relative rotary movement between the insulating ring 38 and the casing, but permits limited vertical movement between the two said parts. Springs 45 are arranged around the posts 43 between shoulders or abutments thereon, and the under side of the ring 43, whereby there is a constant tendency for the two said rings 38 and 43 to come together, and upward movement of the ring 38 is resisted.

The lower ends of the posts 42 rest upon arms 46 which project divergently upward from a ring 47 to which they are secured. The ring 47 is secured to the casing 26 by a gimbal connection comprising horizontal pivots, and an intermediate gimbal ring 48, whereby the said ring 47 is free to move with respect to the casing 26 in the usual manner permitted by gimbal joints, but is compelled to partake of its rotative movement. Mounted immediately beneath the casing 26, and concentrically with the bearing point 25, is a short shaft 49. This shaft is mounted upon the casing 26 and moves with it, partaking of all its movements, but having, in addition thereto provision for independent revolution, that is to say, the shaft 49 may revolve freely with respect to the casing 26. The shaft 49 carries four arms 50, at the ends of which are anti-friction rollers 51. The anti-friction rollers 51 are of different sizes, two of the opposite rollers, as appearing in Fig. 9, being, respectively, of relatively large and small diameter, and the intermediate rollers being each of a diameter between the diameters of the two rollers as appearing in Fig. 9. These anti-friction rollers engage the underside of the ring 47, and because of their different diameters tip it to a position oblique with respect to the compass casing 26. When the shaft 49 is rotated the said ring will be tipped progressively all around its circumference, this movement corresponding to the movements of the solar system known as movements of nutation, and, in order to simplify the description herein, I will hereafter refer to the movement of this member, and to corresponding movements of other parts controlled thereby, as movements of nutation. The movement of nutation thus imparted to the ring 47 will be transmitted through the arms 46 to the posts 42, and thence to the insulating ring 39, so that, at each revolution of the shaft 39, a complete movement of nutation will be imparted to the insulating ring 38 with respect to the casing 26 carrying it.

The compass needle 24 is provided with an arm 52, which carries a contact member 53. The contact member 53 is preferably pivoted to the arm 52, and is adapted to rest lightly upon the contact strips 39 and 40 or 39 and 41. The member 53 is insulated from the said arm 52, and forms merely a bridge or cross-over by which the circular contact strip 39 is electrically connected with either of the outer segments 40 or 41. Under normal conditions, however, the contact member 53 is suspended above the contact strips, freely clearing them, so as in no wise to impede the horizontal movement of rotation of the compass needle. In its movement of nutation, however, the insulating strip 39 will be periodically lifted at a point beneath the contact member 53, whereby the said contact member will be engaged by the contact strip, so that contact will be intermittently or periodically made for a short interval, with longer intervening intervals during which the needle is entirely free to move. It will also be noted that, by reason of the fact that the movement of the ring 38 is at substantially right angles to the horizontal plane of movement of the compass needle and part 53 carried thereby, the impact of the engagement just described between the contact member 53 and the contact strips will have no tendency to impart swinging movements to the needle in either one direction or the other.

The shaft 49 is connected by universal joints 54 and a telescopic connecting member 55 with a vertical shaft 56, which is driven through suitable gearing by a continuously rotating motor 57. This form of shaft connection will maintain the shaft 56 in constant driving relation with the shaft 49 without in any way interfering with the freedom of the swinging movements which it derives from the casing 26 upon which it is journaled. The connecting gearing here shown comprises a pinion 58 upon the motor shaft 217, which is in mesh with a spur gear 59 upon an intermediate shaft 60. The intermediate shaft 60 carries a worm 61, which engages a worm wheel 62 upon the said vertical shaft 56. The motor 57 may be of any form, but is preferably, and as here shown, an electric motor, which may receive its current from any suitable source of supply. In Fig. 18, I have shown the motor diametrically as connected by means of wires 102, 103, with main line wires 100, 101, which lead from a source of current supply, not shown. Resistance 104 is preferably included in one of the wires, as wire 102, so that the current normally passes to the motor through such resistance. A centrifugal governor 63 is provided, by means of which current may be supplied through a shunt 105 around the resistance through a circuit closing device 64, should the speed of the motor drop below a predetermined point. By this means the motor may be caused to rotate at a practically uniform rate of speed.

The motor 57 also furnishes the power for rotating the platform 32 and parts carried thereby, but the transmission from said motor to said platform is through a magnetic clutch mechanism which I will now describe.

The magnetic clutch appears in several of the drawings, but shows more clearly in Fig. 6 and detail Figs. 10 and 11. It comprises a shaft 65, which is mounted to rotate freely in suitable bearings, and is provided about midway with a disk 66, which constitutes an armature for two sets of electro-magnets. These sets of electro-magnets, which are designated respectively by the reference characters 67 and 68, are secured to gear-wheels 69 and 70, said gear-wheels mounted to rotate loosely upon the said shaft 65. The gear-wheel 69 is arranged in mesh with a pinion 71, upon the said intermediate shaft 60, while the gear-wheel 70 is arranged in mesh with an idler gear 72, which is in turn in mesh with a pinion 73 upon the shaft 60. Thus the two gear-wheels 69 and 70 are driven constantly from the motor through the intermediate shaft 60, but in opposite directions. If either of the sets of magnets 67, 68, is energized, the disk armature 66 will be attracted thereby, and the shaft 65 will be caused to rotate in a direction in which the energized set of electro-magnets is revolving. By energizing either one set or the other of the electro-magnets 67 or 68, it will be seen, then, that the shaft 65 may be caused to rotate in either direction, as desired. The shaft 65 is provided at one end with a bevel pinion 74, which is arranged in mesh with a complementary bevel pinion 75. The latter is arranged fast upon a short vertical shaft 76 arranged to rotate in fixed bearings suitably supported, the said vertical shaft 76 connected by means of universal joints 77 and an oblique connecting member 78 with another vertical shaft 79 journaled in bearings 80 near the upper end of the machine. The shaft 79 is provided with a bevel gear 81, arranged in mesh with a bevel pinion 82, mounted upon a horizontal shaft 83, which is in turn provided with a worm 84, engaging the peripheral teeth 37 of the platform 32. Rotation, then, of the magnetic clutch shaft 65 in either one direction or the other results in rotation in a corresponding direction of the platform 32 and parts carried thereby. In order to transmit current to the coils of the electro-magnets 67, 68, I have provided each of the gear-wheels 69, 70, with an insulated member 85, 86, each of which carries contact strips suitably connected with the said coils. Stationary brushes 87, 88, mounted upon suitable insulating blocks, engage the said strips. One of the said brushes of each of the set of coils connect through wires 106 and 107 with the contact points of selecting relays 89, 90, while the other brushes connect to a common return strip 99, from which a wire 109 leads to one of the main line wires 100.

The selecting relays appear in several of the figures, but are shown more clearly in Figs. 6 and 15. The said relays comprise electro-magnetic coils 91, 92, pivoted armatures 93, 94, contact points 95, 96, to which the wires 106 and 107 are connected, and a common back-stop 97. The armatures are normally attracted toward the back-stop by means of a spring 98 secured to both of them, which spring not only forms a means for drawing the said arms rearwardly, but also an electrical conductor to electrically connect the said armatures together. The back-stop is connected by means of a wire 108 to the line wire 101. The coils 87 and 88 are electrically connected by wires 110 and 111 (see diagrammatic Fig. 18) with the contact segments 40 and 41, while the common return for the said coils connects with the main line wire 100. The circular contact strip 39 is connected by means of a wire 112 with the main line wire 101. In the actual machine the wires 110, 111 and 112 do not connect directly with the contact strips 39, 40 and 41, as shown in the diagrammatic Fig. 18, but with three brushes 120, which are mounted upon an insulating block 121 secured to the shelf 36, said brushes arranged in contact with three metallic rings 122, 123, 124, mounted upon, but insulated from, the supports 30 carried by the platform 32. These rings are, in turn, connected by means of flexible wires 125 to the strips 39, 40 and 41, respectively, the said rings 122, 123, 124, partaking of the rotary movement of the insulating ring 38, while the movement of nutation of the latter ring with respect to the said rings 122, 123, 124, is compensated for by the flexibility of the wires 125.

Returning now to the driving mechanism, it will be seen that the intermediate shaft 60 is provided at its outer end with a worm 126, which engages the teeth of a worm wheel 127 mounted upon the upper end of an oblique shaft 128. Said shaft 128 penetrates the platform 129 upon which the magnetic clutch, selecting relays, and other mechanism contained within the chamber 22, are supported, and which serves to divide the intermediate chamber 22 and lower chamber 23 from each other; and, at its lower end, is provided with a worm 130 which engages the teeth of a worm wheel 131 mounted upon a drive shaft 132. The drive shaft 132 carries a roller 133, which has a friction surface as of rubber, and which forms the drive for a web 134 which constitutes the record sheet. The supply from whence the web is drawn is mounted upon a shaft 135 journaled in suitable bearings 136 in the lower compartment 23, the said web passing from the roll upon the shaft 135 under a guide bar 137, around a guide roller 138 journaled in bearings secured to the platform 129, over a guide roller 139 near the upper end of the compartment 22, down around and beneath the drive roller 133, thence to a take-up roller 140, which is loosely supported upon drive rollers 141, the trunnions or shaft of the said roller 140 being guided between the standards 142. The drive rollers 141 are driven from the drive shaft 132 by means of a gear-wheel 143 thereon, an idler gear 144, a gear-wheel 145 secured to rotate with one of the said drive rollers 141, another idler gear 146 and a gear-wheel 147 upon the other of the said drive rollers 141. The drive roller 133 times the movement of the web or record sheet, while the loose friction drive of the take-up roller 140 is arranged to drive the take-up roller 140 at a speed slightly in excess of the speed of movement of the web, the excess of movement being compensated for by a slight slipping, whereby the web rolled up upon the roller 140 will always be firm and tight. Spring pressed friction fingers 148 are preferably employed to cause the web to hug closely to the main drive roller 133 so as to prevent any slippage taking place between the sheet and this roller.

The direction roller 139, which, as has been called attention to, is arranged near the upper end of the compartment 22, is just at the rear of, and in close proximity to, a disk 149. This disk 149 carries recording fingers 150, which may include pencils, pens or other devices for producing marks upon the said record sheet, and are so arranged with respect to the said record sheet that one or other of the said fingers will be in engagement with the front of said record sheet, for all positions of the disk, a platen 151 being provided at the rear of the sheet to form a backing therefor at the point at which the recording points of said fingers engage same. The disk 149 is mounted to rotate upon a stationary stud 152, and a gear-wheel 153 is secured to the said disk so that it will rotate therewith. This gear-wheel is arranged in mesh with a worm 154 upon the vertical shaft 79, so that, whenever the compass casing 26 is caused to rotate, the said disk will necessarily rotate synchronously therewith.

The relationship of the gearing between the disk 149 and the rotating platform 32, which carries the compass casing 26, is as one is to four, so that every time the platform 32 and compass casing carried thereby performs one complete revolution, the disk 149 will move through one quarter of a revolution. The disk, however, being provided with four recording fingers, provision is made whereby one recording finger will come into action upon one side of the said record sheet at the moment another recording finger leaves it upon the other side, so that a recording finger will always be in engagement with the record sheet for every position of the said disk 149. A cam piece 216 is arranged near one edge of the sheet and in the path of movement of that part of the fingers 150 carrying the recording points, whereby the said fingers will be lifted as they pass the edge of the sheet, so as to lift them on to the sheet and to cause them to engage the same at the proper point.

The web constituting the record sheet may be conveniently divided up into eight longitudinal strips by ruled lines, each strip being again divided longitudinally into eight subdivisions. A strip of this description is shown as mounted in the machine in Fig. 1, and in the said sheet the central line is intended to correspond to the point N of the compass, while the outer lines correspond to the point S. Both outer lines will correspond to the point S because the record sheet as a whole may be considered as corresponding to the development of a cylinder cut along the line S. The intermediate lines between S and N on either side will represent SW, W, and NW on one side of the central line N, and NE, E and SE on the other. The sub-divisions between these lines will, of course, represent the other well known subdivisions of the compass.

In Fig. 1, one of the recording fingers 150 is shown as in register with the line N, and it will be readily understood that, if the disk 149 is caused to revolve with the compass for, say, a complete revolution, the said finger will gradually move over to the edge of the sheet so as to register with the line S on one side or other of the central line, and, at the moment the said finger registers with the line S upon one side, another finger will have come into play and will be in register with the line S upon the other side of the central line, so that, on a continuation of the movement of the disk to complete the movement corresponding to a revolution of the compass, the new said finger will continue a movement along the record sheet until it has arrived in register with the central line N to take the place of the finger which has passed on. During all this time, however, the sheet will have been traveling lengthwise, for it will be remembered that the sheet is moved slowly at all times by the motor, so that, although the finger 150 will be once more in register with the central line N, it will be resting upon the record sheet at a point in advance of where it first rested, the distance between the two points representing the time elapsed between the commencement and the completion of the turning movement. In the drawing Fig. 1 I have shown a line $x$ which corresponds to the turning movement above described, and it will be seen that not only has the complete turning movement been recorded, but it also appears that, in turning, the movement was from N to E to S to W and back to N, and not in the opposite direction.

To understand how the movements of the parts are brought about to correspond with the movements of the compass needle, I will now explain the general operation of the device with particular reference to the diagrammatic Fig. 18. It must be first borne in mind that the motor 57 is intended to be run continuously, and that thereby there will be a continuous rotary movement of the central shaft 49, and hence a constant movement of nutation, as above described, transmitted to the insulating ring 38, whereby there will be a continuous operation of the circuit making and breaking device comprised in the contact member carried by the compass needle and the contact strips carried by the said insulating ring 38. There will also be a continuous feeding movement of the record strip, and a continuous movement in opposite directions of the magnetic coils 67 and 68 of the magnetic clutch. As in a normal condition there is no circuit through the magnetic clutch, the normal condition of the armature disk and shaft upon which it is mounted will be a stationary one, and hence there will be no movement normally transmitted through the oblique connecting shaft 78, and thus no movement of either the disk 149 or the platform 32 which carries the compass casing and other parts.

Assuming now that the contact member 53 carried by the compass needle, and hence the compass needle itself, is directly over a point 155 upon the insulating ring, which point is a point between the ends of the segmental contact strips 40, 41, and which point may hence be termed a neutral point, it will follow that either no circuit at all will be completed when the insulating ring in its movement of nutation rises so as to cause the inner contact ring 39 to be engaged by the contact member 53, or two circuits will be closed, one between the segmental strip 40 and the circular strip 39, and the other between the segmental strip 41 and the circular strip 39. If no circuit is closed at all there will be no current through the selecting relays, and hence no current through the magnetic clutch, and no operation of the mechanism. If both circuits are completed, both sets of coils 91 and 92 of the selecting relays will be energized, and both armatures 93 and 94 attracted. The circuits for the coils may be traced as follows: for the coil 91, from the line wire 101, through the connecting wire 112 to the circular contact ring 39, through the contact member 53 to the segmental contact strip 40, through the wire 110 to the coils 91, and through a common return back to the line wire 100. A similar circuit for the coils 92 may be traced from the line wire 101 through the connecting wire 112 to a circular contact ring 39, through the contact member 53 to the segmental contact strip 41, through the wire 111 to the coils 92, and back through the common return to line wire 100. The energization of both selecting relays 87, 88, causing, as it does, the attraction of both the armatures 93, 94, to their contact points 95, 96, respectively, prevents the establishment of any circuit through to the coils 67, 68 of the magnetic clutch, because both of the said armatures in such position will be away from the back-stop 97, and, as will presently be made clear, it is absolutely necessary that one of the said armatures be against the back-stop in order that circuit may be completed through any part of the said magnetic clutch. Thus it will be seen that, so long as that part of the circuit making and breaking device comprising the insulating ring 38 and springs carried thereby, is in a neutral position with respect to the other member of the circuit making and breaking device comprising the contact member 53 carried by the compass needle, there will be no tendency for one of the said contact members to rotate with respect to the other. When, however, the compass needle moves to the right or left, operation of the circuit closing means immediately produces movements of the parts tending to again bring the insulating ring and all parts connected directly or indirectly therewith to a point neutral with respect to the needle, so that all the parts may be said to have a tendency to follow the movements of the needle, and will so follow the needle in all its movements in either direction.

Assuming now that the needle moves over to the right, it will then have carried the contact member 53 over the segmental strip 41. When the insulating ring 38, in its movement of nutation, lifts the contact strips to cause them to engage the contact member 53 carried by the needle, circuit will be closed between the segmental contact strip 41 and the circular contact strip 39. This will establish a circuit from line wire 101, through connecting wire 112 to circular strip 39, thence through contact member 53 to segmental strip 41, through connecting wire 111 to the coils of the selecting relay 88, thence through the common return of the selecting relays to the other line wire 100. The coils 92 of the selecting relay 88 will now be energized, and the armature 94 will be attracted so as to complete circuit through the said armature and the contact point 96. A circuit will now be established through the magnetic clutch as selected by relay 88 as follows: Commencing with the line wire 101, circuit may be traced through the wire 108 to the back-stop 97, from the back stop 97 current will pass through the armature 93 of the relay 87, the said armature at this time resting against the said back-stop, current will then pass from the armature 93 to the armature 94, through the spring 98, thence through the contact point 96 and wire 107 to the electro-magnetic coils 68 of the magnetic clutch, thence back through the common return 109 to the other line wire 100. Energization of the coils 68 will cause the disk armature 66 to rotate in the direction of rotation of the gear-wheel 70, and a proper movement of rotation will be imparted through the bevel gear-wheels 74, 75, shafts 76, universal joints 77, and oblique connecting member 78 to the vertical shaft 79. Rotation of this shaft, as above specifically described, will result in a rotative movement of the platform 32 and compass casing carried thereby, and a corresponding rotative movement of the disk 149. These parts will move for as long a time as the contact member 53 is closing circuit through the contact strips, but immediately circuit is broken at this point, all movement of the said parts will cease, because deënergization will take place (first) through the selecting relay, and the secondary circuit through the magnetic clutch will immediately thereafter be broken at the point 96. This will deënergize the magnetic clutch coils and the magnetic clutch shaft 65 will immediately come to rest. The gearing and the magnetic clutch are so arranged and designed that the foregoing movements will be in a direction to catch up with the prior movement of the compass needle, and if sufficient movement is not imparted thereto for the short time contact is maintained between the contact member 53 and the contact strips carried by the insulating ring, then a continuation of such movements will be effected at the next closing of circuit, which will take place at each revolution of the shaft 49, and hence each movement of nutation of the ring 58. When sufficient movement has been given to the parts to cause the compass casing to catch up with the compass needle, no more movement will be imparted thereto until the needle again moves in one direction or the other. If by chance an excess of movement was given to the parts, or the needle were to move in an opposite direction, then circuit would be closed at the next operation of the circuit closer through the contact strip 40, with the result that the selecting relay 87 would be energized, the coil 67 of the magnetic clutch would be caused to operate, and the compass casing would then be moved in an opposite direction to catch up with the needle in such direction.

Bearing in mind that every movement of the compass casing is accurately recorded on the chart, by reason of the fact that the disk and recording points are traveling transversely thereof in exact synchronism with the movement of the compass casing, and that the record strip upon which the chart is plotted is traveling slowly forward, it will then be understood how an accurate chart corresponding to all movements of the compass will be plotted upon the said record strip, and that hence all movements of a ship upon which the apparatus is placed will be accurately recorded for future reference. In actual practice it has been found that there is a tendency for the parts to move backwards and forwards even though the ship is holding a comparatively true course, so that, on the actual record, a zigzag line will usually appear, having, however, the general direction of the course indicated. This is due to several causes: In the first place, the smallest vibration of the needle tends to cause circuit to be closed upon one side or the other. When circuit is so closed upon one side the parts will be moved for an appreciable distance in the opposite direction. The next time circuit is closed, it will be closed upon the other side of the center of the neutral point, and hence the parts will move back again a distance just sufficient to again pass said neutral point. When the ship turns in its course, however, the line plotted will be a true one, and not a zigzag line, because the parts will continue to turn in the same direction until the turning movement is completed. In Fig. 1 the chart therein indicated accurately represents a chart under varying conditions. The zigzag portion of the line referred to appears at $y\,y$, changes of course appear at $z\,z$, while $x$ represents a complete turn around.

I will now take up the means for recording distances and time intervals: This means comprises a counter 156, a time stamp 157, and actuating mechanism by which the counter and time stamp are caused to print an impression or record upon the record sheet. The time stamp 157 may be of any well known ordinary mechanism such as is on the market to-day, comprising impression wheels to which a step by step movement is imparted by electro-magnetic means under the control of suitable circuit controlling mechanism. The circuit controlling mechanism may conveniently comprise a clock train of gearing 158 arranged to close circuit at predetermined intervals of time, such, for instance, as at the end of every five minutes.

In the diagrammatic Fig. 18, I have shown a conventional form of circuit closer comprising a wheel 159 arranged to be geared with the clock train so as to make a complete revolution once for every hour, said wheel 159 having thereon twelve teeth or projections adapted to engage with a contact finger 160. The wheel 159 is of conductive material but each tooth has an insulated portion whereby the said wheel is thus arranged to make and break circuit with the finger 160 twelve times in its revolution, so that twelve impulses per hour, one for each five minutes, will be transmitted to the time stamp, as will be well understood. The said electro-magnetic means may comprise an electro-magnet 161 connected on one side to the finger 160 by a wire 113, and on the other side by wires 114, 115, with the line wire 101. The contact wheel 159 is shown as connected by a wire 116 with the line wire 100. The electro-magnet 161 is provided with an armature 162, the lever of which connects with an operating arm 163 for the time stamp mechanism by means of a link 164. The said time stamp 157 is carried by a frame 165, which is pivotally mounted upon a stationary bracket 166. An operating arm 167 is secured rigidly to the said bracket, whereby reciprocating movements of the said arm will cause a rocking of the bracket upon its pivotal support.

The bracket and time stamp are arranged contiguous to one edge of the record sheet, the time stamp being immediately in front of the face of the said sheet and over the platen 151. The reciprocating operating movement just described will then cause the time stamp to be moved toward and away from the record sheet, and suitable inking mechanism being provided, such for instance as an ink ribbon 168 together with the ordinary or any suitable form of feeding device therefor, record impressions of time will hence be printed upon the said sheet, as appears in Fig. 1. The means for actuating the said operating arm 167, and which, from the fact that it causes an impression to be recorded or printed upon the record sheet, may be termed printing mechanism, is also designed to be controlled electrically at predetermined intervals of time, which intervals may conveniently be the five minute intervals at which the time stamp receives its impulses. For this purpose, therefore, I have provided a relay including an electro-magnet 169, which I herein term the printing relay or printing electro-magnet, said electro-magnet being arranged in series with the time stamp electro-magnet 161, as shown in the diagrammatic Fig. 18, the electro-magnet itself appearing in detail in Fig. 14. This electro-magnet is provided with an armature 170, connected by means of a link 171 with a rocker arm 172, said rocker arm mounted upon a short shaft 173, the opposite end of which carries a pawl 174 (see particularly Fig. 12.) This pawl is normally in engagement with a notch or tooth in a tumbler 175, pivoted at 176 to a stationary support. This tumbler is overbalanced as to gravity upon the side of its pivotal support nearest the pawl, and hence would fall but for the support of the pawl.

When the electro-magnet 169 is energized, the pawl will be released from engagement with the tumbler, and the tumbler will fall for a distance limited by the platform 129 or other part of the frame upon which it may rest. The said tumbler 175 is provided with a laterally extending tooth 177, which is arranged to be normally clear of a connecting rod 178, the lower end of which is free, but the upper end of which is pivotally connected to the said operating arm 167. The lower free end of the connecting rod normally rests against a stop 179. When, however, the tumbler 175 falls, owing to its release from engagement with the pawl 174, the tooth 177 falls against the connecting rod 178 and passes beneath a shoulder 180 therein finally engaging said shoulder. In this position the said tooth will lift the connecting rod when the tumbler is returned to its normal position, that is to say, the position in which it is shown in Fig. 12, from its fallen position as above described.

The lifting of the connecting rod 178 will effect a movement of the operating arm 167 to which its upper end is connected sufficient to produce a printing movement of the frame 165 and printing wheels carried thereby. The said movement of the tumbler 175 is effected by means of an eccentric pin 181 carried by a disk 182 mounted loosely upon the shaft of the motor 57. This disk 182 is normally held against rotation, but, at suitable intervals, it is caused to make one revolution with the shaft upon which is is mounted, and if, at the time that it makes such revolution, the tumbler 175 be tripped, the eccentric stud or pin 181 carried thereby will engage a shoulder 183 upon the said tumbler 175 to thereby return the said tumbler to its normal position. The operation of this disk 182 is controlled by means of a one-revolution clutch 184, itself controlled by a relay 185 comprising an electro-magnet 186 and an armature 187. The armature 187 is mounted upon a pivoted lever 188, to the upper end of which is pivoted a tripper 189. This tripper, which is normally pressed upwards by a leaf spring 170, is provided with a hook-like end adapted to engage a pin 191 upon a latch 192. The latch 192 forms a normal support for a detent 193, which is pivoted at 194 to a stationary support, the opposite end of which is in normal engagement with one end of a pivoted pawl 195. The said pawl 195 is pivotally mounted upon a disk 196, which is rigidly secured to the said disk 182 by means of studs or bolts 197, and a spring 198 normally tends to press the said pawl inward, while its engagement with the said detent 193 keeps it forced outward against the resistance of said spring.

The shaft of the motor 57 carries a ratchet wheel 199 rigidly secured thereto, the teeth of which are adapted to be engaged by the said pawl. When the coils 186 of the relay 185 are energized, and the armature lever 188 moves toward the said coil by the attraction of the armature 187 carried thereby, the tripper 189 will engage the pin 191 to cause the latch 192 to be disengaged from the detent 193, allowing the said detent to become disengaged from the pawl 195. This will permit the pawl to be moved inward at the end opposite to the end at which it is normally engaged by the said detent 193, so that it will be engaged by the teeth of the ratchet wheel 199. It will be remembered that the motor shaft is running all the time, hence the ratchet wheel 199 will be running, and the disk 196 to which the pawl is pivoted, and hence also the disk 182 connected to the said disk 196, will be carried around with the said motor shaft. The disk 196 has a cam-like periphery, which is adapted to engage an arm 200 dependent from the said detent 193, the said arm 200 being slightly offset so as to be coincident with the plane of movement of the said disk 196. As said disk revolves, therefore, it will engage the said arm 200 and will re-set the detent 193, returning it to its normal position, in which position it is shown in the drawings.

A spring 201 extends between the latch 192 and the detent 193, tending to force the two said parts into engagement with each other, hence, as the detent is re-set against the resistance of the said spring 201, the latch 192 is brought into position to engage same, as will be well understood. The latch 192 will be free to engage the detent 193 whether the electro-magnet 186 of the relay 185 has been deënergized or not, because the laterally projecting pin 202 upon the said detent to which one end of the said spring is connected, is so arranged as to strike one end of the tripper 189 when the detent drops, and will thereby free it from engagement with the pin 191, so that the tripper is free from engagement with the pin 191 immediately it has done its work of tripping the latch 192, and will not be permitted to again engage the said pin until after the coils of the relay 185 have been deënergized and again energized. The re-setting of the detent 193 will bring the end thereof into the path of movement of the projecting portion of the pawl 195, so that, at the end of a complete revolution of the disk 196, the pawl 195 will be engaged by the detent 193 to first release the pawl from engagement with the ratchet wheel 199, and at substantially the same moment to stop further movement of the disks carrying it. A pin 203, carried by a spring finger 204, engages an abutment or tooth 205 upon the disk 196 to prevent any rearward movement of the same such as might happen from re-action or other causes.

From the foregoing it will be seen, then, that the device just described is a positive one-revolution clutch; that at every impulse given to the relay a single complete revolution—no more and no less—will be imparted to the disks 196, 182; and that, as the motor is arranged to be running at a high rate of speed, such movement will be given quickly, positively and with great precision. The operation of this one-revolution clutch effects, as before stated, the re-setting of the tumbler 175, if the tumbler has been already tripped by the operation of the printing relay, but it has another function, which is to operate the counter 156. This is effected by means of an operating arm 206, pivoted at 207 to a stationary support, the eccentric pin 181 upon the disk 182 being received within a slot 208 in the said operating arm, as is fully illustrated in Fig. 12. The pivot 207 of the operating arm 206 is a short shaft, to the opposite end of which is secured another arm 209 connected by means of a connecting link 210 with an operating lever 211 by which the counter is actuated to print.

The counter 156 may be of any suitable character, and is conveniently an ordinary numbering head provided with wheels to which step by step movements are imparted at every operative movement of the operating lever 211. The said counter is carried upon the frame 165 with the time stamp 157 and inking mechanism, comprising an ink ribbon 212 and feeding means therefor, corresponding to the inking mechanism 168 for the time stamp, may be employed. The numbering wheels of the counter will thus be given an impulse for every revolution of the one-revolution clutch, and hence for every impulse given to the relay 185, but a record thereof will only be printed when the printing relay 169 is operated. It may be noted that the printing mechanism is operated during the first portion of the movement of the disk 182 of the one-revolution clutch, during which time the pin 181 moves along the slot 208 without imparting any substantial movement thereto at all. In other words, this movement of the clutch is during substantially lost motion so far as the operation of the counting wheels is concerned. Thus the operation of the printing, and the step by step movement of the counting wheels, though operated by the same actuating means, will not interfere with each other. The counter and time stamp being carried together upon the frame 165, a record from both the time stamp and the counter will be simultaneously made upon the record sheet for every impulse given to the printing relay.

Referring now to the diagrammatic view Fig. 18, it will be seen that the coils 186 of the relay 185 are connected on one side with the line through a connecting wire 117, and on the other side with a circuit closing device 213 through a connecting wire 118. The circuit closing device 213 is in turn connected with the line through a connecting wire 119, so that the coils 186 of the relay 185 are connected and disconnected with the line through the said circuit closer 213. The circuit closing device 213 is shown diagrammatically as comprising a rotary member 214, connected to the wire 118, and a brush 215 connected to the wire 119. The said rotary member may be connected with any moving part by the revolutions of which it is desired to count. It may be connected with the engine shaft either directly or indirectly through reducing gearing, or it may be connected to a class of log commonly employed in connection with vessels for measuring distance, known as a "patent log." With whatever it is connected, it is designed to make and break a circuit at periodical intervals, which may conveniently represent intervals of distance, whereby the counting mechanism may be employed to count units of distance. Thus the counter becomes an instrument by which units of distance may be recorded, while the time stamp is an instrument by which units of time may be recorded. The units of distance may, of course, be any desired unit, such, for instance, as five miles, or, if the counting device be connected with the engine, the unit may represent, say, every five hundred revolutions of the propeller shaft. Likewise, the unit of time may, of course be any desired interval, a convenient unit, as above stated, being five minutes. It may also be noted that, if the counting device be employed to register revolutions of the propeller shaft, and a plurality of shafts be employed, a plurality of similar counters may be employed, if desired, one for each propeller shaft. Both these units of time and distance are printed along the edge of the record sheet at predetermined intervals, the position of the said time and distance intervals corresponding upon the sheet with the "direction" at that moment being recorded by the direction recording mechanism, by reason of the fact that the several recording means are arranged substantially in line with each other, as will readily appear from an inspection of the drawings. Transverse lines may conveniently appear on the record sheet blank, as shown, to facilitate the correlative reading of the different records.

From a consideration of the foregoing, it will then be seen that, with an instrument of this description on ship-board, a complete record of the ship's actions as to time, distance, speed and direction will be accurately recorded for any period. As the machine is designed to be running at all times regardless of whether the ship is in port or at sea, the record will not only show the entire course of the ship during all the time it is moving and the time spent therein, but will also record the time spent at any ports the ship may touch; the time spent with the ship at anchor, including the direction in which the ship is lying either when at anchor or in port; and the speed of the ship during any part of its journey may be quickly and accurately computed by calculating the ratio between the distance traveled and the time consumed therein. It will also be noted that, while the speed of the motor will probably be quite regular and reasonably accurate whereby the travel of the sheet at all times will be substantially uniform, such accuracy or uniformity is immaterial to the accuracy of the record, because the time is calculated and recorded entirely from the time mechanism which is controlled from a clock or other accurate time measuring means.

It is intended that, in practical use, a certain length of record strip shall be removed from the instrument from time to time and kept on file in the home office, but, when one section of the strip is removed, it is intended that the web shall be immediately connected up again, so that successive strips will constitute a continuous record. Thus, with trans-Atlantic liners, the strip may be removed every time the ship reaches a home port and a new strip immediately connected up, the removed strips being taken to the home office, and there kept on file and checked off as a check upon the master of the vessel; or in vessels that travel long distances, or cruise from place to place, a section of the chart may be removed periodically at periodical intervals of time. Such a provision is convenient in that the charts filed will then be of uniform length and not too unwieldly in size.

As a special use of the instrument, an ideal or master chart may be provided from the home office, either made from an ideal previous trip, or mathematically designed to represent ideal conditions, with instructions to follow the chart as closely as possible. The chart plotted by the vessel on its trip in the instrument will show how closely the master has come to these ideal conditions, and unwarranted deviations therefrom would require an explanation.

In the modified structure illustrated in Figs. 16 and 17 of the drawings, the terminals, which are shown in the form of circular and segmental strips 39, 40 and 41, in the other figures, appear as short strips 219, 220, 221, with upturned end portions 222, while the contact member, corresponding to the member 53 of the other figures, comprises three portions 223, 224, 225, the portions 223, 225 arranged to laterally engage the upturned parts 222 of the strips 219, 220, 221, while the lower portion 224 engages the main part of the said strips. The end portions 222 will limit the movement of the compass needle with respect to the ring 38, but, as the ring 38 has a constant tendency to follow the movement of the needle to maintain the same in a neutral position with respect thereto, i. e. in line with a point 155, the compass needle will be normally free to swing right and left upon either sides of said point. If the compass needle suddenly tends to shift to a greater degree than is permitted by the upturned end portions, circuit will be established by such contact and will remain closed until the ring 38, in its rotative movement, has caught up, or almost caught up, with the said needle. In the structure, then, shown in Figs. 16 and 17, the parts will tend to more quickly adjust themselves to greater relative movements of the compass needle than will the parts in the other figures, because, during such relatively greater movements, circuit will be closed for a longer period at a time in the former structure than in the latter. The strips 219, 220, 221, are electrically connected in the same way as are the strips 39, 40 and 41, and any of the three parts 223, 224, 225, of the contact member in the structure shown in Figs. 6 and 7 will act as a bridge to connect strips 220 or 221 with the strip 219, as will be well understood.

What I claim is:

1. The combination with a rotating indicator and a circuit making and breaking member carried thereby, of another circuit making and breaking member mounted to rotate concentrically with said indicator, and means for reciprocating the last said member toward and away from the member carried by the indicator transverse of the plane of rotation thereof.

2. Means for recording the successive positions of a compass needle, including a circuit controller having a part mounted to rotate with respect to said compass needle and arranged to be moved toward and away from the compass needle in a direction transverse of the plane of movement of the needle, and a part carried by the needle with which said first named part intermittently engages when so moved.

3. The combination with a rotating indicator and a circuit making and breaking member carried thereby, of another circuit making and breaking member mounted concentrically with said indicator, and means rotatively mounted with respect to the last said member for reciprocating the last said member toward and away from the first said member in a direction transverse of the plane of rotation thereof.

4. Means for recording the successive positions of a compass needle including a circuit controller having a part mounted to rotate with respect to said compass needle and arranged to be moved toward and away from the compass needle in a direction transverse of the plane of movement of the needle, a part carried by the needle with which said first named part intermittently engages when so moved, and a recording device under the control of the said circuit controller.

5. Means for recording the successive positions of a needle or pointer including a circuit controller comprising a part having movements of nutation with respect thereto, transverse of the plane of movement of said needle or pointer.

6. Means for recording the successive positions of a needle or pointer including a circuit controller having a part mounted concentrically therewith, and means for imparting movements of nutation to the said part, transverse of the plane of movement of the said needle or pointer.

7. Means for recording the successive positions of a needle or pointer including a circuit controller having a part mounted to rotate concentrically therewith, but independently thereof, and means for imparting movements of nutation to the said part, transverse of the planes of rotation of the said parts, to effect intermittent contact between them.

8. Means for recording the successive positions of a compass needle including a circuit controller having a part arranged to be moved toward and away from the compass needle in a direction transverse of the plane of movement of the compass needle, said part also arranged to move in directions corresponding to the directions of the movements of said compass needle, under control of the said circuit controller.

9. Means for recording the successive positions of a compass needle including a circuit controller comprising a part having movements of nutation with respect thereto, transverse of the plane of movement of said compass needle.

10. Means for recording the successive positions of a compass needle including a circuit controller having a part mounted concentrically therewith, and means for imparting movements of nutation to the said part, transverse of the plane of movement of the said compass needle.

11. Means for recording the successive positions of a compass needle including a circuit controller having a part mounted to rotate concentrically therewith, but independently thereof, and means for imparting movements of nutation to the said part, transverse of the planes of rotation of the said parts, to effect intermittent contact between them.

12. A compass recording device comprising a circuit closing member carried by the compass needle, two other circuit closing members, movable transversely toward and away from the first said member, and a supporting element for the last said members, mounted to rotate concentrically with the said compass needle, said circuit closing members adapted to control circuits by which the element carrying them is caused to rotate in one direction or the other in accordance with the circuit closed, to follow the movements of the needle.

13. The combination with a compass needle, of a circuit closing member carried thereby, an element mounted to rotate concentrically with said needle, a ring divided into two segments carried by said element, each said segment constituting a circuit closing member, means for reciprocating said element toward and away from the needle transverse of its plane of rotation, means controlled by said circuit closing members for rotating said element in one direction or the other to follow the movements of the needle, and recording means having movements synchronous with the movements of rotation of said element 14. The combination with a compass needle, of a member mounted to rotate concentrically therewith, said member carrying the terminals of two electric circuits, means for reciprocating the said member to cause the circuit making and breaking element to intermittently engage the compass needle, and means for rotating the said element in one direction or the other in accordance with the circuit closed by such engagement.

15. The combination with a compass needle, of a member mounted to rotate concentrically therewith, said member provided with a circuit controlling element including the terminals of two electric circuits, means for causing the said element to intermittently engage the compass needle, means for rotating the said member in one direction or the other in accordance with the circuit controlled, and a recording means arranged to move synchronously with the movements of the said member.

16. The combination with a compass needle, of a member mounted to rotate concentrically therewith, a ring having thereon electric circuit terminals, carried by said member, means for imparting constant movements of nutation to said ring to cause the terminals thereof to intermittently engage the compass needle, means for rotating the said member in opposite directions in accordance with the terminals engaged, and recording means operating synchronously therewith.

17. A compass recording device comprising means for supporting and imparting motion in one direction to a record sheet, a rotatable member carrying a plurality of equidistantly disposed recording fingers which are arranged to travel one at a time over said record sheet, a circuit closing element arranged under electrical control from the compass needle to follow the rotational movements of the said compass needle, and reducing gearing between the said element and the finger carrying member having a ratio proportionate to the number of fingers carried thereby.

18. A compass recording device comprising a circuit closing member carried by the compass needle, two other circuit closing members, movable transversely toward and away from the first said member, and a supporting element for the last said members mounted to rotate concentrically with said compass needle, selecting relays included in circuits controlled by said circuit closing members, and means under the control thereof for rotating the said supporting element in one direction or the other to follow the movements of the needle.

19. A compass recording device comprising a circuit closing member carried by the compass needle, two other circuit closing members movable toward and away from the first said member, and a supporting element for the last said members mounted to rotate concentrically with said compass needle, selecting relays arranged in circuits controlled by the said circuit closing members, driving mechanism normally out of driving engagement with said supporting element, and clutch mechanism controlled by said selecting relays for connecting the said driving mechanism with the said supporting element to drive same in one direction or the other, substantially as set forth.

20. Compass recording means including an element arranged to rotate concentrically with the compass needle and carrying the terminals of two electric circuits, selecting relays governed by said circuits, driving mechanism, and a magnetic clutch for connecting said driving mechanism with said element to drive same in either one direction or the other in accordance with the operation of the selecting relay.

21. Compass recording means including an element arranged to rotate concentrically with the compass needle and carrying the terminals of two electric circuits, selecting relays governed by said circuits, driving mechanism comprising a shaft with a disk armature thereon, and electro-magnetic means geared to rotate in different directions, said electro-magnetic means connected electrically with said selecting relays and arranged, when energized, to cause the said shaft and disk thereon to travel therewith.

22. In a device of the character described, the combination with a compass needle and a casing provided with a bearing point therefor, of a rotatable support, a gimbal connection between said rotatable support and said compass casing, a terminal supporting ring rotatably carried by said compass casing, a contact member carried by said compass needle, and means for imparting movements of nutation to said terminal supporting ring with respect to the said casing.

23. In a device of the character described, the combination with a compass needle and a casing provided with a bearing point therefor, of a rotatable support, a gimbal connection between said rotatable support and said compass casing, a terminal supporting ring rotatably carried by said compass casing, an operating ring, means transmitting movement from said operating ring to said terminal supporting ring, a gimbal connection between said operating ring and said compass casing, a contact member carried by said compass needle, and means for imparting movements of nutation to said operating ring.

24. In a device of the character described, the combination with a compass needle and a casing provided with a bearing point therefor, of a rotatable support, a gimbal connection between said rotatable support and said compass casing, a terminal supporting ring rotatably carried by said compass casing, an operating ring, means transmitting movement from said operating ring to said terminal supporting ring, a gimbal connection between said operating ring and said compass casing, a contact member carried by said compass needle, a vertical shaft having a bearing in said casing member, arms carried thereby, anti-friction rollers adapted to engage said operating ring, and, upon the rotation of said shaft, to transmit movements of nutation thereto, driving means, and a flexible shaft connection between said vertical shaft and said driving means.

25. The combination with means for recording the movements of a compass needle, of a counter, a continuously rotating motor, actuating means for the counter, a clutch between said actuating means and the motor, and electrically controlled means for causing the operation of said clutch.

26. The combination with means for recording the movements of a compass needle, of a counter, a continuously rotating motor, actuating means for the counter, a clutch between said actuating means and the motor, electrically controlled means for causing the operation of said clutch, and means operated at predetermined intervals for recording amounts registered by said counter.

27. The combination with means for recording the movements of a compass needle, of a counter, electrically controlled actuating means for actuating same to register units of distance, and electrically controlled means for recording amounts registered by said counter, at predetermined intervals of time.

28. The combination with means for recording the movements of a compass needle, of a counter, a continuously rotating motor, actuating means for the counter, printing means for recording amounts registered by the counter, a clutch for connecting said actuating means with said motor, electrically controlled means for operating said clutch, and electrically controlled means for causing said printing means to be operated upon the operation of said clutch.

29. The combination with means for recording the movements of a compass needle, of a counter, a continuously rotating motor, actuating mechanism for the counter, a single-impulse clutch arranged to connect said actuating mechanism with said motor, electrically controlled means for operating said clutch, printing means for the counter, means operated upon the movement of the clutch to actuate said printing means, and electrically controlled means for permitting the last said means to operate.

30. The combination with means for recording the movements of a compass needle, of a counter, a motor, actuating means for the counter, a single-impulse clutch for connecting said actuating means with said motor, tripping mechanism normally maintaining the said clutch out of operative position, and electrically controlled means for operating said tripping mechanism.

31. The combination with means for recording the movements of a compass needle, of a counter, a motor, actuating means for the counter, a single-impulse clutch for connecting said actuating means with said motor, tripping mechanism normally maintaining the said clutch out of operative position, electrically controlled means for operating said tripping mechanism, printing mechanism including a part adapted to move into the path of movement of a portion moving with the said clutch, and electrically controlled tripping means for causing the said movement of the said part.

THEODORE M. FOOTE.

Witnesses:
A. V. YOUNG,
D. HOWARD HAYWOOD.